Jan. 12, 1932. F. SINGER 1,840,472
MATRIX DIE FOR EXTRUDING SOLID AND HOLLOW ARTICLES
Filed July 3, 1930
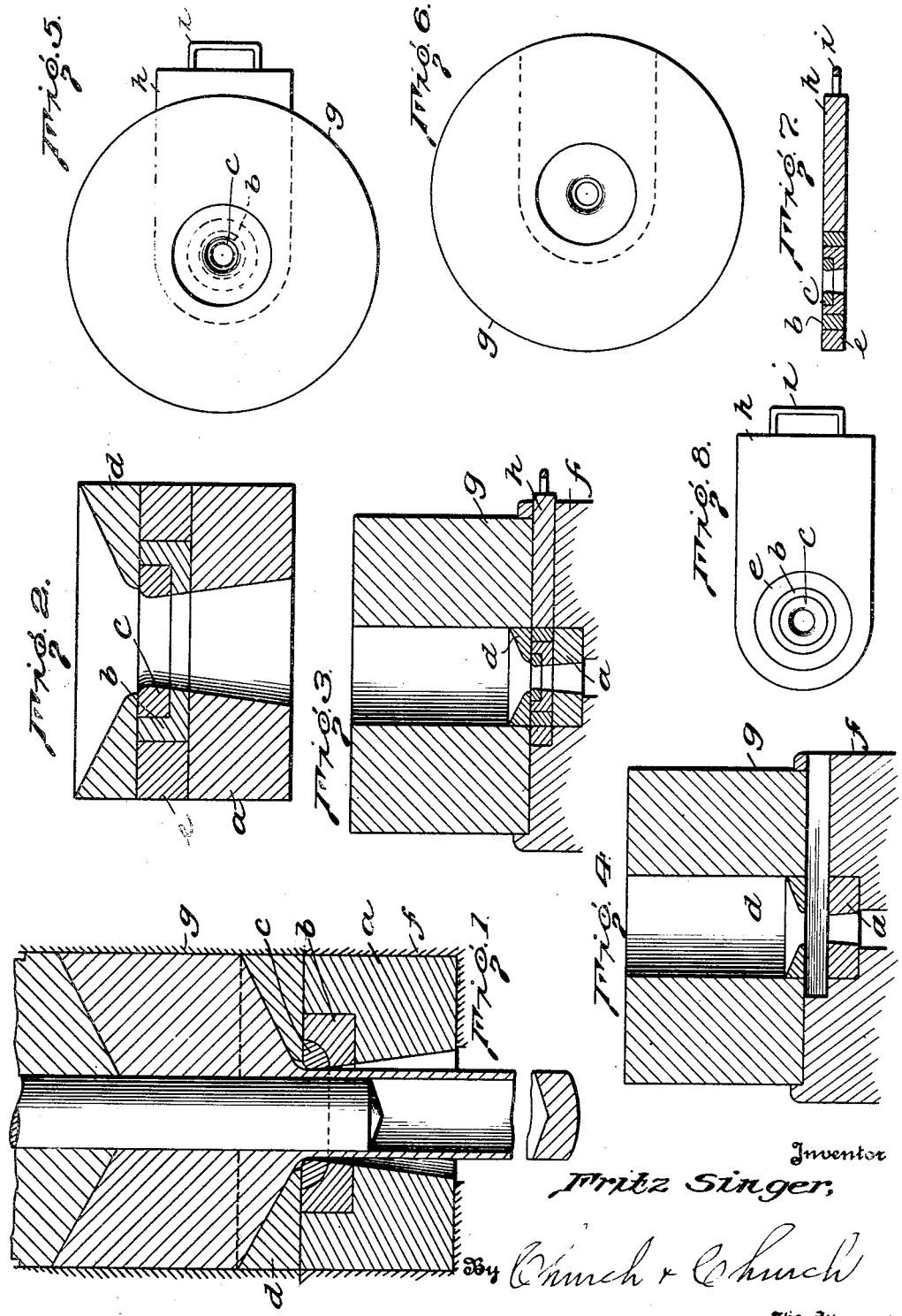
Inventor
Fritz Singer,
By Church & Church
His Attorneys Patented Jan. 12, 1932

1,840,472

UNITED STATES PATENT OFFICE

FRITZ SINGER, OF NUREMBERG, GERMANY

MATRIX DIE FOR EXTRUDING SOLID AND HOLLOW ARTICLES

Application filed July 3, 1930, Serial No. 465,709, and in Germany March 24, 1928.

This invention relates to improvements in matrix dies for extruding solid or hollow articles, such as rods, seamless tubes and the like.

One object of the invention is to provide a matrix die that is composed of subdivisions or sections in order that each section or part thereof may be shaped most conveniently to facilitate the flowing of the metal. Likewise, the die being made of a plurality of sections, each section may be made from a material that will function with the greatest amount of efficiency in so far as resisting the specific stresses exerted upon it is concerned.

Another object of the invention is to provide means for readily substituting a new section or part for the most stressed portion of the die without taking out or dismounting the entire die.

A still further object is to so arrange the several parts or sections that certain parts thereof, such as the lining of the molding ring may be replaced when and as desired without the necessity of substituting or replacing a new billet-bearing ring.

More specifically the invention consists of a matrix die preferably composed of a hollow supporting part, a molding ring adapted to be inserted in said supporting part, a lining arranged within a recess in the molding ring, and a billet-bearing ring of the same outer diameter as the billet but of a greater inner diameter than the inner diameter of said lining, the cross section of said billet-bearing ring forming a scalene rectangular triangle, the angle of which, facing the axis of the ring, is conveniently of approximately 27°.

As will hereinafter be pointed out the most essential parts of the present matrix die are the molding ring with the lining thereof forming the molding edge and the billet-bearing ring. The supporting part, as shown, is not an absolute necessity because the press table itself or a steel plate mounted on the press table may serve as a support for the molding ring. Again, said molding ring need not be necessarily inserted in a recess of the supporting part as it may be shrunk within an armoring ring, which, for convenience, may have the same outer diameter as the supporting part.

The several matrix die parts above mentioned each has a distinct function that requires quite distinct properties from the material from which the respective parts are made. For instance, the supporting part is subjected substantially to pressure only and to no essential heat so that it may be made of a steel of high cold resistance. The molding ring does not require a steel of high resistance at high temperatures as it does not come into contact with the heated billet nor with the extruded article. Other properties inherent in the material forming the molding ring are conditioned upon the kind of lining that is used. This lining is the part most stressed by heat and pressure and can, therefore, be made only of a material of high resistance at high temperatures. Among the materials answering or possessing these qualifications may be mentioned high speed steel, alloyed chill casting, alloys of the stellite type, and fritted compounds of heavy metals of the kind of Widia-metal.

Heretofore attempts have been made to produce matrix dies or molding rings consisting of only one part from high speed steel but dies of this type made entirely from these steels are not durable in that it has been found that they will crack after short usage because of the great differences or variations of heat and pressure to which they are subjected. It has also been proposed to make parts of swages most subjected to wear and tear from alloys of the stellite type by dropping stellite in fluid state upon the spots or portions to be armored, or protected. However, these teachings cannot be utilized in the production of matrix dies because these dies in which only the working edge is made of stellite are not adapted for hot extrusion work. The die parts coming into contact with the heated metal billet require steels of comparatively high tungsten content to be used and it is not practical to armor or protect steels of this kind with stellite dropped thereon. Whenever one wanted to use stellites in matrix dies it was necessary, of course, to use steels such as are capable of being welded with stellite but such steels offered insufficient resistance at high temperatures so that if stellite was used it was necessary to coat not only the working edge but the entire working surface of the die with a sufficiently thick layer of stellite in order to afford the necessary protection of the steel. This, also, was impractical because coating the entire surface with stellite was not only so expensive as to prohibit its use but such extensive coatings of stellite with extruding dies are not durable on account of the difference between the coefficients of expansion of the used stellites and the used steels. With these problems in mind, the present invention contemplates the construction of a die in which the molding ring is covered by the billet-bearing ring but the latter does not fully cover the lining of the molding ring. Such a construction or arrangement admits of the use of such species of steels for the molding ring as have no essential resistance at high temperatures and, therefore, no high tungsten content. On the other hand, the billet-bearing ring should be made from a material that possesses a high degree of toughness and also considerable resistance at high temperatures. In such a matrix die the billet-bearing ring will outlast numerous molding ring linings.

With these and other objects in view the invention consists in certain novel details of construction and combinations and arrangements of parts all as will hereinafter be more fully described and the novel features thereof particularly pointed out in the appended claims.

In the accompanying drawings—

Figure 1 is a vertical cross section of a matrix die made in accordance with the present invention, the molding ring being inserted in a recess in the supporting part in this form of the invention, Fig. 2 is a similar view showing a modified form of die in that the molding ring is shrunk within an armoring ring, Fig. 3 is a vertical cross section of the matrix die together with the container and a part of the press table, showing the position of the matrix die within said container and table and, further, showing the sliding mechanism for changing or replacing the molding ring, Fig. 4 is a view similar to Fig. 3 showing the slide withdrawn, Fig. 5 is a plan view of the structure shown in Fig. 3.

Fig. 6 is a plan view of the structure shown in Fig. 4,

Fig. 7 is a vertical cross section of the slide mechanism and

Fig. 8 is a plan view of the slide mechanism.

Referring to the drawings, the molding ring shown is mounted in a recess in the hollow supporting part indicated, at $a$, in Fig. 1, while, in Figs. 2 and 3 the molding ring is shrunk within an armoring ring $e$ on the support $a$. Formed in the molding ring $b$ is a recess in which is positioned the lining $c$, said lining being preferably in the form of a ring made from high speed steel or any of the other materials before mentioned that offer high resistance at high temperatures and which preferably may be slightly shrunk in the recess of the molding ring. The lining $c$ may also be composed of a number of segments, as indicated in Figs. 5 and 8, or the lining may be made by dropping said materials, in a fluid state, on the molding ring and welding said materials together.

Superposed on the support $a$ and the molding ring, or the molding ring and the armoring ring is the billet-bearing ring $d$, which has the same outer diameter as the billet and whose cross section is a scalene rectangular triangle the angle of which, facing the axis, is conveniently of approximately 27° with the summit of the angle preferably rounded off to create a flowing shade whereby the molding edge of the lining will be disburdened. The bores of the lining, molding ring and supporting part are conically enlarged in the direction of the exuding article. The size of the billet-bearing ring exteriorly is such as to cover or protect the radially outer portions of the molding ring but the interior diameter of the billet-bearing ring is greater than the interior diameter of the lining so that the latter projects radially inwardly beyond the bore of the billet ring but the molding ring, as well as the support and the armoring ring, where the latter is used, are all protected by the billet-bearing ring, whereby steels having no substantial resistance at high temperatures, or steels that do not have a high tungsten content may be utilized in the making of the molding ring. The same is true of the armoring ring where the latter is used.

Referring to Figs. 3 to 8 there is shown at $f$ a press table provided with a recess in which the supporting part $a$ is inserted. A container $g$ is shown in Figs. 3 and 4, and in this form of tool the armoring ring, molding ring and lining are carried in a slide $h$ which can be inserted in and removed from a recess formed within and extending transversely of the press table. A handle $i$ is provided on the slide to facilitate manipulation or handling thereof. With this arrangement when it is desired to replace a molding ring the slide $h$ may be withdrawn from the press table. The billet-bearing ring is retained in its position within the container by the slight plastic deformation caused by the action of the pressure force. After the slide has been removed the armoring ring, together with the molding ring may be pressed out and replaced with another armoring ring containing another molding ring with a new or repaired lining. After this replacement or substitution of the slide part the slide may be again inserted in the recess in the press table to position the bores of the molding ring and lining in proper alinement with those of the support and billet-bearing ring.

What is claimed is:

1. In a press for the hot extrusion of hard and semi-hard metals, the combination with a billet container, and a plunger adapted to be moved towards one end of said container to effect the extruding operation, of a billet-bearing ring disposed in the said end of said container, a support slidably mounted in said end of said container beneath said billet-bearing ring to permit withdrawal of said support, and an apertured matrix ring carried by said support having the edge of the aperture thereof formed of temperature and wear resisting material, the aperture of said matrix being of somewhat smaller diameter than the aperture of said bearing ring.

2. A matrix die for extruding solid and hollow articles comprising an armoring ring, a molding ring shrunk within said armoring ring, means for supporting both rings, a lining in said molding ring and consisting of a material of high resistance to heat and pressure, and a billet-bearing ring of the same outer diameter as the billet to be extruded but of a greater inner diameter than the inner diameter of said lining, and having a cross section forming a scalene rectangular triangle the angle of which, facing the ring axis, being of about 27°.

3. A matrix die for extruding solid and hollow articles comprising a hollow supporting part, an armoring ring, a molding ring shrunk within said armoring ring, a sliding device within the bore of which said armoring ring together with said molding ring are mounted, said sliding device being adapted to be slid transversely to the axes of said rings whereby the molding ring may be removed from the die, a lining in said molding ring and consisting of a material of high resistance to heat and pressure, and a billet-bearing ring of the same outer diameter as the billet to be extruded but of a greater inner diameter than the inner diameter of said lining, and having a cross section forming a scalene rectangular triangle the angle of which, facing the ring axis, being of about 27°.

4. A matrix die for extruding solid and hollow articles comprising a hollow supporting part, an armoring ring, a molding ring shrunk within said armoring ring, a sliding device within the bore of which said armoring ring together with said molding ring is mounted, said sliding device being movable relatively to said support transversely to the axis of said rings whereby the molding ring may be removed from the die, a lining in said molding ring and consisting of a material of high resistance to heat and pressure, and a billet-bearing ring arranged within the bore of the billet container, said billet-bearing ring having a greater inner diameter than said lining and having a cross section forming a scalene rectangular triangle the angle of which, facing to the ring axis, being of about 27°.

FRITZ SINGER.